United States Patent Office 3,314,446
Patented Apr. 18, 1967

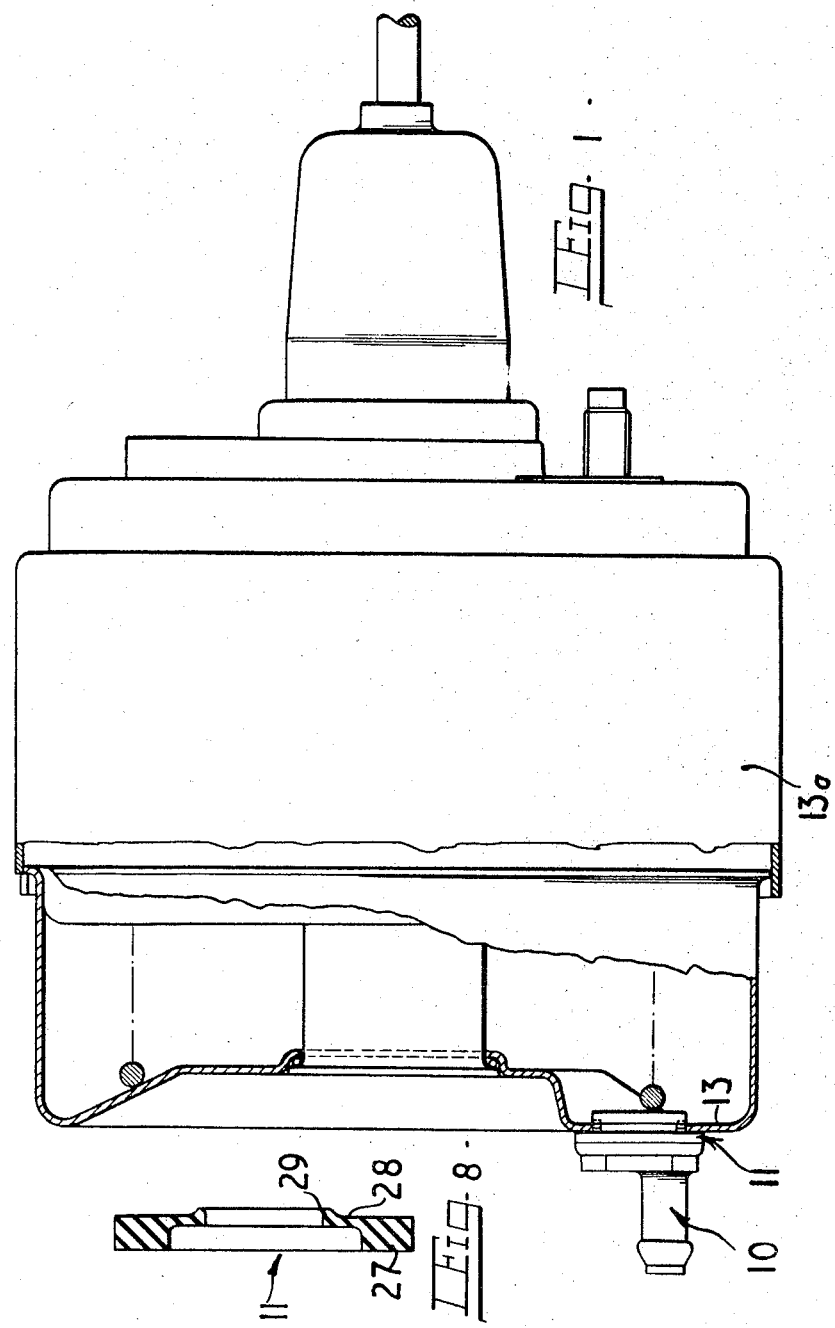

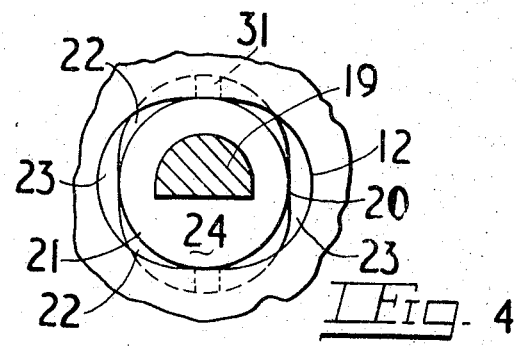
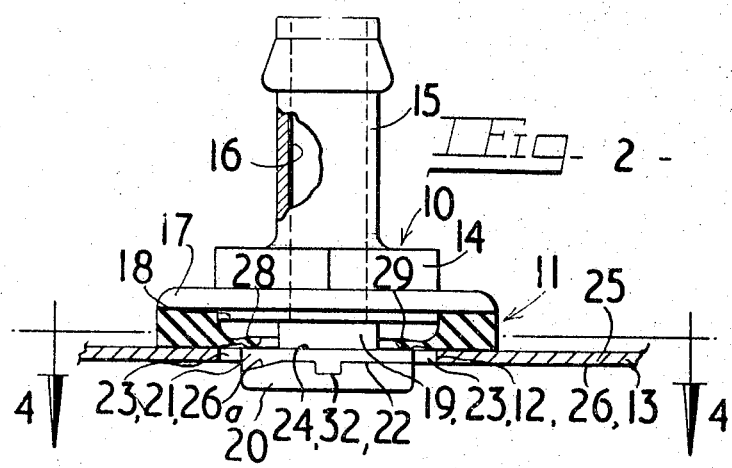
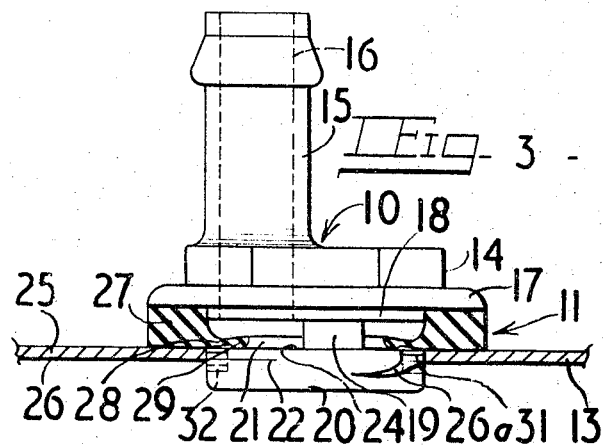

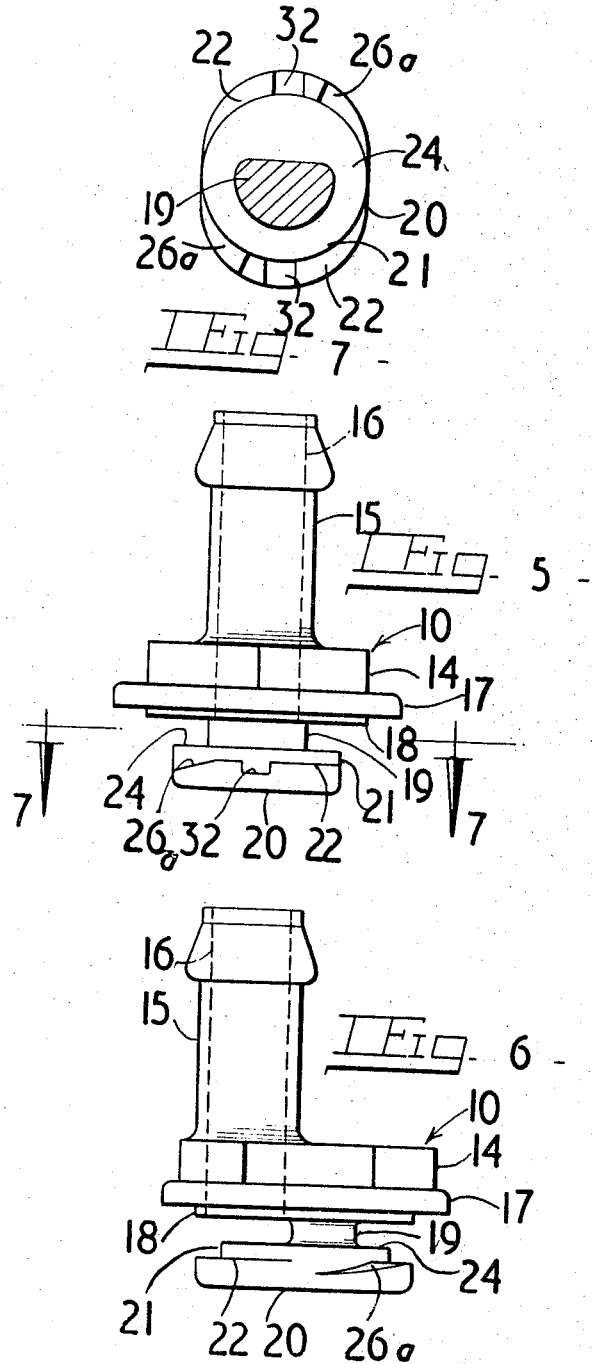

3,314,446
ONE-WAY VALVE
Denis Bryan Saunders, Sheldon, Birmingham, England, assignor to Girling Limited, Birmingham, England, a British company
Filed Dec. 27, 1963, Ser. No. 333,975
Claims priority, application Great Britain, Dec. 30, 1962, 45,295/62
19 Claims. (Cl. 137—516.15)

This invention relates to improvements in one-way valves and concerns a valve which may readily be secured in an aperture in a wall or plate without the provision of any special fixing means such as screws or rivets.

According to the invention we now propose a one-way valve adapted for mounting in an aperture in a wall or plate and to prevent the flow of fluid through the aperture in one direction, comprising a valve body formed with a passage for the flow of fluid, and a valve closure member, in which the valve closure member is also arranged to form a permanent seal between the valve body and a surface of the wall around the aperture. The aperture in the wall or plate is preferably of oval shape and the valve is secured thereto by a clamping member, carried on the valve and of a size and shape corresponding to the aperture, the clamping member being passed through the aperture and the valve being turned through 90° so that lands formed on the ends of the clamping member engage the edges of the aperture. The valve closure member is in the form of a circular ring of resilient material and forms a permanent seal between the valve body and the wall around the aperture, the ring being held in compression by engagement of the clamping member with the edges of the aperture. According to a feature of the invention locating means are provided acting between the lands on the clamping member and the edges of the aperture to locate the valve in the fully-engaged position.

One embodiment of the invention will now be described by way of example, reference being made to the accompanying drawings in which:

FIGURE 1 is a fragmentary elevation of a hydraulic booster unit fitted with a one-way valve according to the invention;

FIGURE 2 is a partly-sectioned view to a larger scale of the valve shown in FIGURE 1;

FIGURE 3 is a partly-sectioned end view of the valve shown in FIGURE 2;

FIGURE 4 is a sectional view with parts removed for clarity, taken on the line 4—4 of FIGURE 2;

FIGURE 5 is an elevation of the body member of the valve shown in FIGURES 1 to 4;

FIGURE 6 is an end elevation of the body member shown in FIGURE 5;

FIGURE 7 is a sectional view of the body member taken on the line 7—7 in FIGURE 5; and FIGURE 8 is a sectional view of a seal, shown in FIGURES 1 and 2, in the free condition.

The one-way valve illustrated comprises a body member generally indicated at 10 and a closure member generally indicated at 11, and is shown in FIGURE 1 secured in an aperture 12 in the wall 13 of a hydraulic booster 13a. As will be seen in FIGURES 2, 3, 5 and 6 the body member has a hexagonal portion 14 on which is mounted in an eccentric position a pipe fitting 15 having a bore 16 which passes through the hexagonal portion and also through a flanged portion 17 and a circular spigot 18 to form a passage for the flow of fluid through the valve body.

Extending from the spigot 18 is a short neck 19 on which is carried an oval clamping member generally indicated at 20. The clamping member extends through the aperture 12 and has a raised circular central boss 21 flanked by a pair of crescent-shaped lands 22 as is best shown in FIGURE 7. In the assembled position shown in FIGURES 2, 3 and 4 the boss 21 occupies the aperture 12 except for two crescent-shaped strips 23 and the upper surface 4 of the boss lies in substantially the same plane as the outer surface 25 of the wall 13.

The aperture 12 has an elongated shape similar to that of the clamping member and when the valve body is in the correct orientation the clamping member can be passed through the aperture. To assemble the valve to the wall the clamping member is passed through the aperture and the valve body is turned through approximately 90° about its own axis to engage the lands 22 with the inner surface 26 of the wall 13 adjacent the narrowest part of the aperture 12. To facilitate the engagement of the lands 22, tapered lead surfaces 26a are provided to enable the edges of the lands to pass smoothly over the edges of the aperture. Locating means are provided to maintain the valve in the fully engaged position shown and comprise tongues or fingers 31 formed at opposite points on the edge of the aperture and arranged resiliently to engage recesses 32 formed in the lands 22 when the valve is in the fully engaged position.

The closure member 11 comprises an L-section ring having a thickened upright limb 27 which seats against the circular step in the body between the flange 17 and the spigot 18 the lower face of this limb being in sealing engagement with the outer surface of the wall 13. The distance from the surface of the lands 22 to the surface of the spigot 18 is less than the free height of the limb 27 plus the thickness of the wall 13 so that in the assembled position the upright limb is in compression and forms a fluid-tight seal between the body of the valve and the wall.

The second limb 28 of the ring is formed with an inwardly extending annular lip 29 and in the free condition (see FIGURE 8) this lip extends beyond the lower surface of the upright limb. In the assembled position the lip 29 is resiliently urged into engagement with the upper surface 24 of the boss 21 to form the valve seat. Pressure fluid acting on the lower side of the wall 13 can easily pass through the strips 23 of the aperture and deflect the lip 29 to pass through the valve. In the reverse direction pressure fluid in the bore 16 causes the lip 29 to be pressed more firmly to its seating and no fluid can pass through the valve.

It has been found in practice that it is desirable to keep the angle through which the clamping member is rotated to engage the sides of the orifice to a minimum as if this angle is too great there is a tendency for the combined seal and closure member to be spread radially outwards under the flange 17 on assembly. This effect is minimised if the angle of rotation is kept to a value of approximately 45°.

The valve described above is particularly advantageous because of its simple construction as it is comprised of two parts only, the body and the closure member. Furthermore, the valve is very easily assembled and is self-locking. Although in the example described the pipe fitting 15 is situated in an eccentric position on the valve body, it could easily be arranged to be centrally situated.

I claim:

1. A one-way valve for mounting in an aperture in a plate to prevent the flow of fluid through the aperture in one direction, comprising, a valve body, a passage in said body for fluid flow therethrough, an extension on said body, clamping means on said extension engageable with the edges of the plate defining said aperture, a valve seat on said extension, a combined valve closure member and seal carried on said body and movable towards and away from a closed position in which flow of fluid through said passage in one direction is prevented, said closed position being defined by engagement of said valve closure member with said valve seat, in the assembled position said combined valve closure member and seal defining an annular seal surrounding said aperture between the valve body and the surface of said plate.

2. A one-way valve according to claim 1 wherein said clamping means are rigid with said valve body and said extension and are operable on insertion of said extension in said aperture and rotation thereof, to engage said plate about the edges defining said aperture and clamp said valve thereto.

3. A one-way valve according to claim 2 further comprising co-operating locating means on said extension and on said plate, said location means being operable on insertion of said extension in said aperture and on rotation thereof, to releasably locate said valve in a fully engaged position with said plate.

4. A one-way valve according to claim 3 wherein said locating means comprise projections formed in said plate in the region of said edges and co-operating recesses formed on said extension.

5. A one-way valve for mounting in a non-circular aperture in a plate to prevent the flow of fluid through the aperture in one direction, comprising, a valve body, a passage in said body for fluid flow therethrough, an extension on said body, clamping means on said extension fixed relatively to said body and engageable with the edges of the plate defining said aperture, a valve seat on said extension, a combined valve closure member and annular seal carried on said body and having a closure member movable towards and away from a closed position in which flow of fluid through said passage in one direction is prevented, said closed position being defined by engagement of said valve closure member with said valve seat, in the assembled position said combined valve closure member and seal defining an annular seal surrounding said aperture between the valve body and the surface of said plate, said clamping means being engageable on insertion of said extension in said aperture and on rotation of said valve body and extension with respect to said aperture, engagement of said clamping means being effective to clamp said annular seal between said valve body and said plate.

6. A one-way valve according to claim 5 wherein said combined valve closure member and annular seal is of resilient material, said closure member being defined by a lip extending radially inwardly from said annular seal and co-operating with a circular seat formed on said extension, operation of said valve being effected by flexure of said lip in response to fluid flow through said valve in one direction.

7. A one-way valve according to claim 6 further comprising co-operating locating means on said extension and on said plate in the region of the edges of said aperture, said locating means being operable to releasably engage said valve in said aperture in a fully engaged position with said plate.

8. A one-way valve according to claim 7 wherein said locating means comprise projections formed in said plate in the region of said edges and co-operating recesses formed on said extension.

9. A one-way valve for mounting in a non-circular aperture in a plate to prevent the flow of fluid through the aperture in one direction, comprising, a valve body, a passage in said body for fluid flow therethrough, an extension on said body adjacent one end of said passage, clamping means on said extension engageable with the edges of the plate defining said aperture, a valve seat on said extension, a combined annular valve closure member and seal carried on said body adjacent said extension, said valve closure member comprising a resilient inwardly extending lip movable towards and away from a closed position in which said lip engages said seat and flow of fluid through said passage in one direction is prevented, in the assembled position said combined valve closure member and seal defining an annular seal surrounding said aperture between the valve body and the surface of said plate and forming a fluid-tight joint therebetween.

10. A one-way valve for mounting in a non-circular aperture in a plate to prevent the flow of fluid through the aperture in one direction, comprising, a valve body, a passage in said body for fluid flow therethrough, an extension on said body adjacent one end of said passage, a boss on said extension defining a circular valve seat thereon, a combined annular valve closure member and seal carried on said body adjacent said extension the closure member being movable towards and away from a closed position in which flow of fluid through said passage in one direction is prevented, said closed position being defined by engagement of said valve closure member with said valve seat, clamping means on said extension, said clamping means comprising a plurality of lands projecting laterally from said extension and being operable to engage said plate behind the edges defining said aperture and to secure said valve thereto, said lands lying in a common plane parallel to the plane of said valve seat but displaced therefrom by a distance not less than the thickness of said plate, in the assembled position said combined valve closure member and seal defining an annular fluid-tight seal surrounding said aperture between the valve body and the surface of said plate.

11. A one-way valve according to claim 10 wherein said combined valve closure member and seal is of resilient material and comprises an annular sealing ring on which is formed an integral inwardly-extending lip which provides the closure member, said seal being received in an annular seat in said body parallel to said valve seat and surrounding said one end of said passage and said extension, said annular seat being spaced from said common plane of said lands by a distance which is less than the combined thickness of said plate and free state thickness of said sealing ring, whereby on engagement of said valve with said plate said sealing ring is compressed to form a fluid-tight joint therebetween.

12. A one-way valve according to claim 11 further comprising co-operating locating means on said lands and said rear face of said plate in the region of the edges defining said aperture, said locating means comprising projections on said plate and recesses in said lands co-operable to locate said valve in a fully engaged position in said aperture.

13. A one-way valve according to claim 12 wherein said extension and said lands are capable of passing through said aperture when in register therewith, said valve being subsequently rotatable to said fully engaged position in which said lands no longer register with said aperture but are engaged behind the rear face of said plate to releasably clamp said valve thereto.

14. A one-way valve according to claim 13 wherein inclined lead surfaces are formed on said lands, said lead surfaces being operative to facilitate engagement of said lands with the rear surface of said plate on rotation of said valve.

15. A one-way valve according to claim 14 wherein said aperture is oval in shape, said lands being two in number and situated at opposite sides of said boss.

16. A one-way valve for mounting in an oval aperture in a plate to prevent the flow of fluid through the aperture in one direction, comprising, a valve body, a passage in said body for fluid flow therethrough, an extension on said body adjacent one end of said passage, a boss on said extension defining a circular valve seat, clamping means on said extension engageable with the edges of the plate defining said aperture, said clamping means comprising a pair of lands which project laterally from opposite sides of said extension and lie in a common plane parallel to the plane of said seat but spaced therefrom by a distance not less than the thickness of said plate, an annular valve closure member and seal carried on said body, said closure member being movable towards and away from a closed position in which flow of fluid through said passage in one direction is prevented, said closed position being defined by engagement of said valve closure member with said valve seat, said extension and lands being capable of passing through said aperture when in register therewith whereby said valve can be secured to said plate by rotation thereof to an engaged position wherein said lands lie out of register with said aperture and engage the rear face of said plate around the edges of said aperture, in the engaged position said seal being in compression and providing a fluid-tight joint between the valve body and the plate.

17. A one-way valve according to claim 16 further comprising co-operating locating means operable to locate said valve in a fully engaged position in said aperture and comprising projections on said plate and co-operating recesses in said lands.

18. A one-way valve according to claim 17 wherein said seal is received in an annular seat in the valve body, said annular seat being parallel to the common plane of the lands but spaced therefrom by a distance which is less than the sum of the thickness of the plate and the free-state thickness of the seal.

19. A one-way valve for mounting in an oval aperture in a plate to prevent the flow of fluid through the aperture in one direction, comprising, a valve body, a passage in said body for fluid flow therethrough, an extension on said body adjacent one end of said passage, a pair of lands on said extension engageable with the edges of the plate defining said aperture, a circular valve seat on said extension, a combined annular valve closure member and seal of resilient material carried on said body on a seat surrounding said one end of said passage and said extension, said valve closure member being formed as an integral inwardly extending lip on said seal and being movable towards and away from a closed position in which flow of fluid through said passage in one direction is prevented, said closed position being defined by engagement of said lip with said valve seat, said lands being capable of passing freely through said aperture when in register therewith, whereby said valve can be rotated to a fully engaged position wherein said lands engage the rear face of said plate around said aperture, inclined leading surfaces being provided on said lands operative to facilitate said engagement, co-operating locating means being provided on said rear face of said plate and on said lands and being operative to locate said valve in the fully engaged position.

References Cited by the Examiner

UNITED STATES PATENTS

| 3,073,339 | 1/1963 | Stelzer | 137—516.15 |
| 3,232,644 | 2/1966 | Pfeifer | 285—361 XR |

FOREIGN PATENTS 803,487 10/1958 Great Britain.

WILLIAM F. O'DEA, *Primary Examiner.*

HAROLD WEAKLEY, *Examiner.*